Oct. 1, 1929.  W. E. TRUMPLER  1,730,019
BALANCING MACHINE
Filed Aug. 25, 1925   2 Sheets-Sheet 1

WITNESSES:
A.G. Schiefelbein
M. Jaspert

INVENTOR
William E. Trumpler.
BY
Wesley G. Carr
ATTORNEY

Oct. 1, 1929.  W. E. TRUMPLER  1,730,019
BALANCING MACHINE
Filed Aug. 25, 1925  2 Sheets-Sheet 2

WITNESSES:
A. J. Schiefellein
M. B. Jaspert.

INVENTOR
William E. Trumpler.
BY
Wesley G. Carr
ATTORNEY

Patented Oct. 1, 1929

1,730,019

UNITED STATES PATENT OFFICE

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA

BALANCING MACHINE

Application filed August 25, 1925. Serial No. 52,369.

My invention relates to balancing machines for dynamically balancing rotors and the like and particularly to a counter-balancing device for counteracting the parasitic or unbalanced masses of the rotors being tested.

It is among the objects of my invention to provide a counter-balancing mechanism which shall be effective for determining the amount and relative location of the unbalanced masses in rotors, such as armatures for dynamo-electric machines or the like.

It is another object of my invention to provide a counter-balance device which shall be of simple, compact and durable mechanical construction and which shall be adapted to be speedily adjusted to provide a couple to oppose the unbalanced masses of such rotors.

Another object of my invention is to provide a counter-balance device of the above-designated character which may be applicable to standard balancing machines without necessitating material alterations in the oscillatable bed member to which it is applied.

In my copending applications, Serial No. 716,331 and 725,352, filed December 20, 1924 and July 11, 1924, respectively, I have described counter-balancing devices for dynamic balancing machines which embody a plurality of axially movable counter-balanced weights that are disposed on an extension of the axis about which the rotor being tested is adapted to rotate. Both of these devices utilize a friction gear mechanism for displacing the counter-balanced weights for the purpose of producing a couple that counteracts the parasitic mass in the rotors.

In the last-mentioned application, I have shown this friction device to be regulated by a plurality of electromagnets that are adapted to actuate the pinion members into engagement with the friction gear for the purpose of effecting angular displacement of the friction wheels, thereby producing axial movement of one of the weights that are attached to the wheels, to effect the couple.

My present invention contemplates the use of a counterbalancing device that produces a static unbalance by means of displacing a weight, preferably of ring shape, in a radial direction, as well as angularly relative to the rotor being tested, while in rotation. The unbalanced movement produced by this displaced weight is proportional to the distance of the weight from the axis of oscillation and the magnitude of the unbalance.

The operation of this device is similar to that of the device set forth in the above-identified copending applications, inasmuch as one relative angular motion between two adjoining discs is used for angular displacement of the weight and the other for radially displacing it. Whether this displacement is obtained by friction rollers or differential gear action, by hand operaton or by magnets is immaterial. The illustrations show gear rims and pinions engaging them. This, however, indicates only one form of operating this counterbalancing device.

It is advisable to use two such balance weights, which are spaced at a constant distance and which are operated simultaneously, thus producing an equal static unbalance in opposition to each other. The effect of two similar static unbalances at a constant distance and in exact opposition produces a dynamic couple indicating, for one position of the weights, an unbalanced moment of constant value irrespective of the location of the axis of oscillation.

In the accompanying drawings, constituting a part hereof and in which like reference characters designate like parts, Figure 1 is a view in longitudinal section of a counter-balancing device embodying the principles of my invention;

Figure 1:
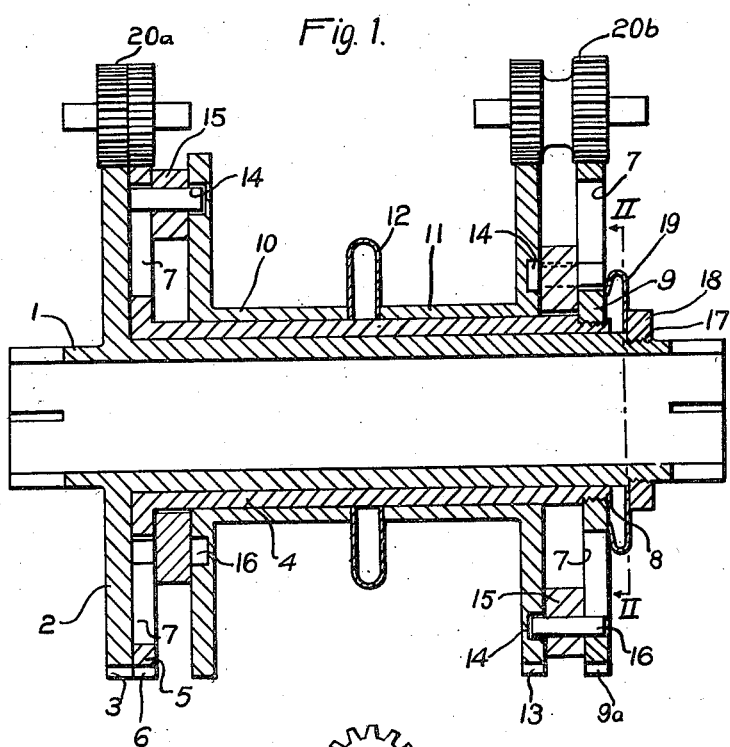
Figure 2:
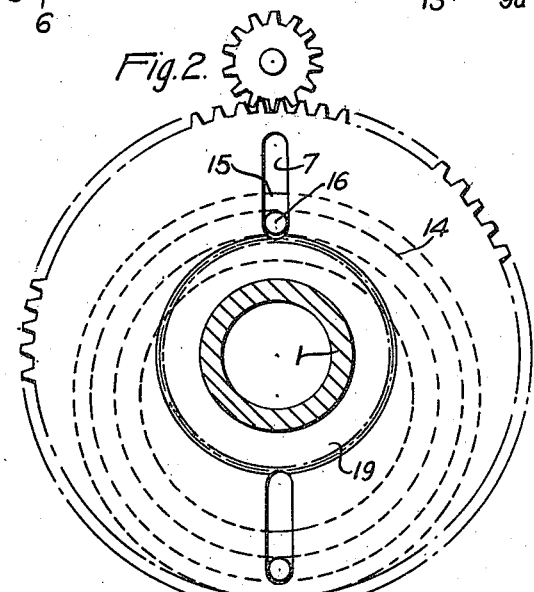
Fig. 2 is a view in end elevation thereof.

Referring to Figs. 1 and 2 of the drawing, the device illustrated therein comprises a quill member 1, which is mounted on, or is otherwise associated with, the spindle or axis of the rotor to be tested, as shown in the type of machine set forth in the first-named application mentioned above, and this quill member is adapted to rotate with such rotor.

The quill member 1 is provided with a flange portion 2 having a toothed outer periphery 3 constituting a gear element. A sleeve member 4 having a flange portion 5 that is provided with gear teeth 6 is journalled for rotation upon the quill 1 and is further provided with radially slotted openings 7, Fig. 2. The extended end of the sleeve member 4 is provided with a threaded portion 8 for receiving a gear wheel or disk 9 having screw-threaded engagement therewith, the gear-wheel 9 being, in effect, the equivalent of another flanged gear member similar to the member 5 and being likewise provided with gear teeth 9a.

Prior to securing the disk 9 on the sleeve member 4, a pair of flanged sleeves 10 and 11, having an annular spring element 12 therebetween, are journalled for rotation upon the sleeve 4. The sleeve member 11 is provided with gear teeth 13 on its outer periphery, and the flange portions of the sleeves 10 and 11 are provided with annular grooves 14 that are eccentrically disposed on their faces, as shown in Fig. 2.

A pair of rings 15, having longitudinally extending pins 16, are respectively disposed between the flanges of the sleeves 10 and 11 and the gear members 5 and 9, so that the pins 16 are in engagement with the slots 7 and grooves 14. One end of the quill 1 is provided with a threaded portion 17, which is adapted to receive a nut 18 that is screwed against an offset or shoulder of the quill. An annular spring element 19 is disposed between the faces of the nut 18 and the gear member 9 to restrain axial movement of the sleeve member 4 and the elements mounted thereon. The spring element 12, which is located between the sleeves 10 and 11, functions in a similar manner as a resilient separator to yieldingly restrain axial movement of the members 10 and 11. The spring elements 12 and 19 also serve to produce friction between adjoining parts, to maintain fixed positions after the creeping action of the gear members has ceased.

Figure 5:
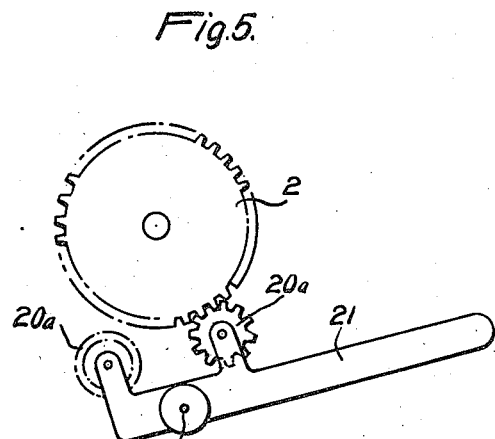
Fig. 5 is a diagrammatic view of the gear-and-pinion mechanism utilized for adjusting the counter-balancing weights.

Referring to Fig. 5, the toothed peripheries 3, 6, 9a and 13 of the gear elements are adapted to be engaged by a plurality of double-faced pinions 20a Figs. 1 and 5 that are rotatably mounted upon an angularly adjustable lever 21, which is pivoted at a point 22 midway between the pinions to adapt the latter to be alternately engaged by raising or lowering the handle portion of the lever. The two faces of each of the pinions 20a and 20b, which are best shown in Fig. 1, are of different tooth ratios, on a standard pitch diameter, which difference is produced in practice by cutting the pinions on a so-called shifting pitch line. The disc rings must be in complete balance for one position of the rings, which is preferably the one extreme position, as shown in Fig. 2.

Figure 3:
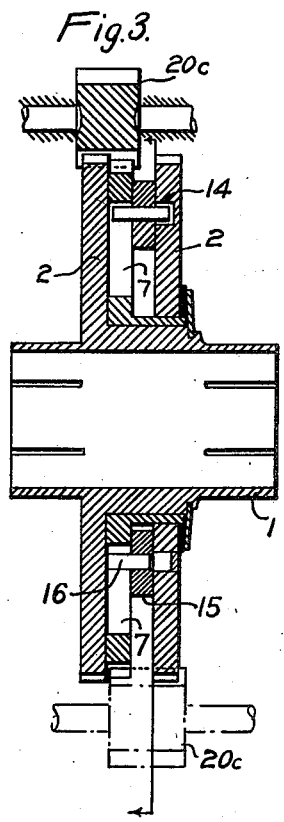
Fig. 3 is a sectional view of a somewhat modified form of the device shown in Fig. 1.
Figure 4:
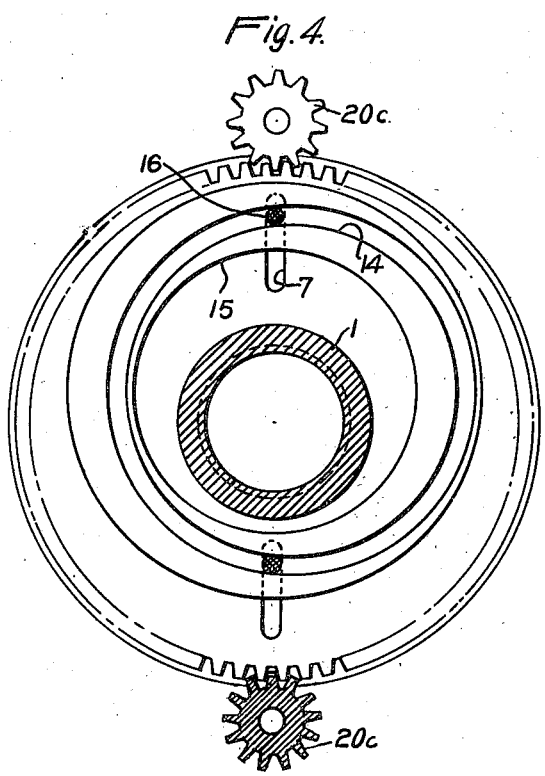
Fig. 4 is a corresponding view in end elevation thereof.

The modification shown in Figs. 3 and 4 is similar to the device shown in Figs. 1 and 2, with the exception that the pinion elements 20c are disposed at the top and bottom of the corresponding gear wheels, as shown, for the purpose of effecting angular displacement between the slotted and grooved gear members, such as 5 and 10, respectively, thus varying the eccentric position of the balancing ring 15. The device shown in Fig. 3 may be utilized either as a single unit, or two of such members may be utilized on the same spindle, in a manner similar to that shown in Fig. 1.

The operation of my apparatus is briefly as follows: The quill member 1 rotates with the rotor being tested, in the manner described in the afore-mentioned applications, with the pinion members 20a and 20b (Fig. 1) out of engagement with the toothed peripheries 3, 6, 9a and 13. The pinions 20a on the left, produce angular displacement of the couple while the set 20b on the right, produces a simultaneous radial motion of the rings or balancing weights 15. The position of the balance rings 15 is immaterial when starting the test, since it is a simple matter to adjust them by displacing the gear elements through contact with the pinions 20a and 20b. The rings, by virtue of their engagement with the slots and grooves 7 and 14, will assume any eccentric position desired, upon relative rotation of the gear-elements, and their proper location is designated by the point where the vibrating element or oscillatory bed member, (not shown) upon which the rotor being tested is journalled, comes to rest.

The rings 15 being angularly displaced, as shown, produce a couple that counteracts the couple effected by the parasitic masses of the rotor being tested and, when the bed member comes to a state of rest, the rotor is in perfect dynamic balance. It is then necessary to permanently ensure this balanced condition by the addition or removal of weight from the rotor, which can be accomplished by any of the methods commonly utilized.

It is evident from the foregoing description of my invention that a counter-balancing device made in accordance therewith provides simple and efficient means for balancing rotors or the like in an expedient and efficient manner. It is further obvious that a device of this nature may be readily applied to various types of balancing machines utilizing an oscillatable bed member that is supported upon spring elements and utilizing a fixed or movable fulcrum member.

Although I have described a specific embodiment of my invention, it will be obvious to those skilled in the art that various modifications may be made in the details of construction and in the design and arrangement of the several cooperating parts without departing from the principles herein set forth.

I claim as my invention:—

1. In a balancing machine, a counterbalancing device comprising a rotatable member, a plurality of adjustable weights mounted in axial spaced relation on the rotatable member and means for adjusting the weights radially to different predetermined positions while the device is rotating.

2. In a balancing machine, a counterbalancing device comprising a rotatable member, a plurality of adjustable weights mounted in axial spaced relation on the rotatable member and means for adjusting the weights radially and angularly while the device is rotating.

3. In a balancing machine, a counterbalance device comprising a quill, sleeve gear-wheels journalled for rotation on said quill, rings movably mounted between said gear-wheels and adapted for eccentric movement relative thereto, and pinion members for engaging the outer toothed periphery of said gear-wheels.

4. In a balancing machine, a counterbalance device comprising a quill, sleeve gear-wheels journalled for rotation on said quill, rings movably mounted between said gear-wheels and adapted for eccentric movement relative thereto, and pinion members for engaging the outer toothed periphery of said gear-wheels, said gear-wheels and pinions being arranged to effect relative angular movement of the former to alter the effective unbalanced mass of the rings associated therewith.

5. In a balancing machine, a counterbalance device comprising a quill, sleeve gear-wheels journalled for rotation on said quill, some of said gear-wheels having annular grooves eccentric to their axis and others of said gear-wheels having radial slots, rings disposed between said grooved and slotted gear-wheels and having pins engaged with said grooves and slots, and pinions adapted to engage said gear-wheels to effect angular displacement thereof for either direction of rotation.

6. In a balancing machine for testing rotors, a counterbalancing device comprising a rotatable member, a plurality of movable weights mounted on the rotatable member in axial spaced relation, means for displacing the weights in a radial direction and means for adjusting the weights angularly relative to the rotor being tested while the rotor and weights are rotating.

7. A balancing head for association with a rotor to be balanced to counteract the unbalanced mass in one end thereof, said balancing head comprising a rotatable member, a plurality of movable weights mounted in axial spaced relation on the rotatable member and means for displacing said weights radially and angularly with respect to said rotatable member while the member is rotating.

8. A counterbalancing device for a balancing machine comprising a rotatable member adapted to be associated with a rotor to be balanced, a plurality of movable balancing weights mounted in axial spaced relation to the rotatable member and in fixed angular relation to each other, means for effecting angular adjustment of said weights with respect to the rotatable member and means for effecting radial adjustment of said weights while the member is rotating.

In testimony whereof, I have hereunto subscribed my name this 6th day of August 1925.

WILLIAM E. TRUMPLER.